United States Patent [19]

Raj et al.

[11] Patent Number: 4,692,826
[45] Date of Patent: Sep. 8, 1987

[54] BEARING ASSEMBLY WITH INTEGRATED FERROFLUID SEAL

[75] Inventors: Kuldip Raj, Merrimack; Raoul Casciari, Bedford, both of N.H.

[73] Assignee: Ferrofluidics Corporation, Nashua, N.H.

[21] Appl. No.: 851,799

[22] Filed: Apr. 14, 1986

Related U.S. Application Data

[63] Continuation of Ser. No. 526,781, Aug. 26, 1983, abandoned, which is a continuation-in-part of Ser. No. 450,339, Dec. 16, 1982, Pat. No. 4,407,508.

[51] Int. Cl.$^4$ ............................................. G11B 5/012
[52] U.S. Cl. ........................................ 360/97; 277/80; 384/478
[58] Field of Search ............................ 360/97–99; 384/133, 478; 277/80

[56] References Cited

U.S. PATENT DOCUMENTS

| | | | |
|---|---|---|---|
| 2,834,618 | 5/1958 | Wiltse | 277/80 |
| 3,620,584 | 11/1971 | Rosenweig | 277/80 X |
| 4,301,487 | 11/1981 | Maruyama | 360/130.24 |
| 4,491,888 | 1/1985 | Brown | 360/97 |
| 4,531,846 | 7/1985 | Raj | 277/80 |

FOREIGN PATENT DOCUMENTS 838223  6/1981  U.S.S.R. ........................... 384/478

Primary Examiner—A. J. Heinz
Attorney, Agent, or Firm—Richard P. Crowley

[57] ABSTRACT

A bearing assembly with an integrated single-stage ferrofluid seal incorporated therein, which assembly comprises: a bearing assembly having an inner and outer race to define a raceway and a plurality of rolling elements within the raceway to permit rotation of the inner and outer races relative to one another; and a single-stage ferrofluid seal within the raceway and positioned adjacent one side of the roller element, and which ferrofluid seal comprises a single pole piece having one end which extends into a close, noncontacting relationship with the surface of the inner and outer races to define a radial gap, ferrofluid in the radial gap to form a seal, an annular permanent magnet secured to and adjacent the single pole piece, and a nonmagnetic permeable housing extending about a portion of the pole piece and the permanent magnet, to divert magnetic flux toward the surfaces of the inner or outer race in which the ferrofluid seal is formed in the radial gap, thereby providing a compact, integrated bearing assembly with a ferrofluid seal.

15 Claims, 3 Drawing Figures

BEARING ASSEMBLY WITH INTEGRATED FERROFLUID SEAL

REFERENCE TO PRIOR APPLICATION

This is a continuation of co-pending application Ser. No. 526,781 filed on Aug. 26, 1983 and now abandoned, which is a continuation-in-part of U.S. Ser. No. 450,339, filed Dec. 16, 1982, now U.S. Pat. No. 4,407,508, issued Oct. 4, 1983 (hereby incorporated by reference).

BACKGROUND OF THE INVENTION

Bearing assemblies are employed to provide a sliding or rotating movement and typically provide support and permit rotation of a rotatable shaft element with a minimum of friction. For example, bearing assemblies, such as ball- or roller-bearing assemblies, are employed to support the spindle-disc-drive shaft employed to drive a computer magnetic disc which is read by a memory head. The computer disc and memory head must be protected from an outside environment, and typically a ferrofluid exclusion seal is employed, and such ferrofluid exclusion seals are employed as a separate component. While the ferrofluid exclusion seal used, for example, with a rotating shaft, such as a computer-disc-drive shaft or spindle, is satisfactory, having the seal apparatus as a separate component, is not always satisfactory, particularly where space requirements are at a minimum.

Ferrofluid seal apparatuses, such as multiple-stage seal apparatuses, have been employed in conjunction with ball bearings to support a shaft, such as, for example, set forth in U.S. Pat. No. 3,620,584, issued Nov. 16, 1971. Further, ball-bearing assemblies have been employed using a magnetic ball bearing, in order to retain ferrofluid lubricants in place, such as set forth in U.S. Pat. No. 3,977,739, issued Aug. 31, 1976.

This application is a continuation-in-part of the single-pole-piece ferrofluid seal apparatus as described in U.S. patent application Ser. No. 450,339, filed Dec. 16, 1982 (now U.S. Pat. No. 4,407,508, issued Oct. 4, 1983), which application is hereby incorporated by reference. This application described a single-pole-piece seal apparatus having a single magnetically permeable pole piece, an annular permanent magnet, means to secure the pole piece and the magnet together, and with one end of the pole piece extending into a close relationship with the surface of the shaft to be sealed, to define a radial gap, and ferrofluid disposed in the radial gap, to provide an exclusion seal or a pressure-type seal. The magnetic flux path of the single-pole-piece seal extends through the permanent magnet, the single pole piece, the ferrofluid in the radial gap, the shaft element to be sealed and an air gap between the shaft element and the other end of the permanent magnet, with typically the radial gap being shorter or less in gap length than the air gap. The single-pole-piece ferrofluid seal apparatus is particularly useful where space is at a premium, and where the shaft comprises a small-diameter, high-speed shaft element, and with the magnetic flux concentrated in the radial gap, the magnetic flux density in the air gap being quite small.

Therefore, it is desirable to provide a bearing assembly having an integrated, single-pole-piece ferrofluid exclusion seal, wherein which bearing assembly is compact in design and is particularly useful where space requirements are important.

SUMMARY OF THE INVENTION

The invention relates to a bearing assembly containing an integrated ferrofluid seal, and more particularly the invention concerns a ball-bearing assembly containing an integrated, single-pole-piece ferrofluid exclusion seal incorporated therein of a unique and compact design, and to a method of operating such baring assembly, and to the computer-disc-drive system in which such bearing assembly is incorporated.

It has been discovered that a bearing assembly, particularly a ball-bearing assembly that incorporates an integral single-stage or single-pole-piece ferrofluid seal therein, provides for a unique and novel bearing assembly and an integrated seal which has a small axial length, compared with the employment of a bearing assembly and seal as separate components, particularly where space is at a premium, such as in a bearing assembly and seal employed in a computer-memory-disc-drive spindle and system. It has been found that the integration, in the manner described and claimed, of a ferrofluid single-pole-piece seal into a bearing assembly allows for a significant and substantial reduction in overall axial length, which makes the bearing assembly especially attractive, with shaft elements and spindles, where a compact design is essential. The ferrofluid exclusion seal replaces the separate-component ferrofluid seal or the general elastomeric-type seal used in bearing assemblies. The elastomeric-type seals tend to generate heat, particles, and particularly provide for an ineffective sealing arrangement with time.

The bearing assembly of the invention is particularly useful with computer-disc-drive spindles, and wherein a ferrofluid exclusion seal is required, in order to protect the memory head from particulate or other contamination. However, it is recognized that the bearing assembly may be employed in a variety of other applications, such as in electric motors which are required to be sealed, for example, in the textile industry, from fiber or particle contamination, or for use in stepper motor to seal and protect the ball bearing from a hostile environment. The invention will be described, for the purpose of illustration only, employing an exclusion-type, single-pole-piece seal; however, it is recognized that pressure-type-capacity ferrfluid, with separate ferrofluid O-ring seals, also may be incorporated in the beaing assembly, such as by employing two or more edges at the end of the single pole piece or grooves in the shaft element to be sealed.

The bearing assembly of the invention comprises a bearing assembly, typically a ball-bearing assembly, which includes inner and outer races, to define a raceway, and contains therein a plurality of roller elements, such as ball-bearing elements within a cage or keepter, which in combination provide for the relative rotation of the inner and outer races relative to each other, with the inner and outer races adapted to surround one race to be secured to a movable mechanism, particularly a rotatable shaft, such as the shaft of a disc drive or motor shaft. The ferrofluid seal assembly, which is integral with the bearing assembly, comprises a ferrofluid seal apparatus positioned within the raceway and closely adjacent ot the roller elements, such as the ball-bearing elements, and typically, as in its use with computer-disc drives, its positioned toward the environment to be protected; that is, the memory-head area in its computer-disc-drive application.

The single-pole-piece ferrofluid seal comprises a single, magnetically permeable pole piece, an annular permanent magnet usually directly secured to one side of the annular pole pice, the pole piece extending generally perpendicular to the inner and outer races and generally across the raceway, one end of which extends into a close, noncontacting relationship with the inner surface of the inner or outer raceway, to define a radial gap. A sealing amount of a ferrofluid is placed in the radial gap; for example, about 2-6 mils, to provide for an exclusion seal, with the ferrofluid held in place by a magnetic flux passing through the radial gap.

The integral ferrofluid seal also includes a nonmagnetically permeable housing, such as an aluminum housing, which is positioned such as to divert magnetic flux of the permanent magnet toward the inner or outer, rather than the other, race; that is, toward the race surface inw hich the ferrofluid radial sealing gap is formed. Where the ferrofluid seal apparatus is placed in a ball-bearing assembly for a computer-disc-drive spindle, then the nonmagnetic housing typically is positioned such as to divert magnetic flux toward the inner, rather than the outer, race. The nonmagnetic housing is essential to the operation of the integral seal, and generally comprises in section an L-shaped, annular housing of a nonmagnetic material, such as aluminum, or plastic material, which insulates the one end of the pole piece which does not form the radial gap, and also insulates the one end of the permanent magnet from the other inner or outer race surface, and generally extends along a portion or usually a substantial portion of the one side of the annular permanent magnet between that side of the magnet and the roller elements of the bearing assembly and toward the other end of the magnet where the air gap is formed. By this arrangement, the roller elements, such as the ball barings, which are typically composed of steel or magnetically permeable material, are protected from any magneti flux from the adjacent permanent magnet. Typcially, the bearing assembly; that is, the ball bearings and the inner and outer races, are of a magnetically permeable material. It is desirable to prevent magnetif lux from going through the inner and outer races and the ball bearings, so as to prevent additional stresses on the bearing assembly. Thus, the employment of a nonmagnetic housing and the sue, for example, of a low-energy permanent magnet are desirable, in order not to disturb the bearing-assembly materials or operation by external magnetic forces or stress.

Thus, for example, in one embodiment, the permanent magnet employed should be a low-energy permanent magnet, such as a magnet composed of a ceramic or polymeric material, such as a rigid-type polymeric material containing a combination of a nylon resin with magnetic particles, or an elastomeric-type magnet which is more flexible and which contains elastomeric materials, such as rubber containing magnetic paticles. Such low-energy magnets generally may have a flux energy of about 1.1 million gauss-oersteds to about 1.6 million gauss-oersteds. Typically, such magnets provide for a flux density ranging from about 2000 to 5000 gauss int he air gap formed in the integrated, single-pole-piece ferrofluid seal apparatus.

While the bearing assembly with the integrated ferrofluid seal is both compact and unique in design, it has a smaller axial length, compared with a separately composed, two-pole-piece ferroflud seal. The ferrofluids employed also may be selected so that the ferrofluids are compatible with the grease or lubricant material employed in the roller elements of the bearing. Generally, grease is placed inside the raceway bearing between the surface of the roller elements and the raceway, to provide for a low-friction operation of the bearing assembly. Generally, such grease is a hydrocarbon-based grease, and, therefore, it is desirable to employ a ferrofluid having the same or similar and at least compatible carrier liquids, such as a hydrocarbon-carrier liquid-based ferrofluid. It has been found that, if the ferrofluid is not wholly compatible, then the physical forces involved in the bearing assembly may throw out the grease employed, to contact the closely adjacent ferrofluid int he radial gap or the seal and may destabilize the ferrofluid, or the ferrofluid can absorb the grease and be affected in its colloidal stability, thereby shortening the life of the ferrofluid seal. Thus, it is desirable to provide for a ferrofluid seal material which is compatible with the grease employed in the bearing assembly, and generally both are hydrocarbon-based. While the magnetic forces may alter the viscosity and magnetization of ferrofluid, the selection of a compatible ferrofluid is important, to ensure further long-term life for the integrated seal, particularly where the ferrofluid seal is closely adjacent to the roller elements on the side of the environment which is to be protected.

In another embodiment, the bearing assembly also may include a magnetically permeable; for example, steel, splash guard extending generally across the raceway and generally adjacent the nonmagnetic housing, to define a small radial air gap. It has been discovered that the splash guard increases the pressure capacity of the integrated, single-stage, single-pole-piece ferrofluid seal by a factor of about two. The splash guard reduces any splash and intermixes or contacts between the ferrofluid and the lubricant of the roller elements. However, the splash guard also importantly, aids in completing the magnetic flux circuit, by extending beyond the one end of the permanent magnet and toward the inner surface of the outer or preferably inner race; that is, the same surface of the race where the ferrofluid is held in the radial gap, to aid in completing the magnetic circuit.

In a further embodiment, the bearing assembly may include both a dynamic and a static ferrofluid seal; that is, a dynamic ferrofluid exclusion seal, with the surface of the moving member, typically the inner race, and a static ferrofluid exclusion seal with the surface of the nonmoving member, typically the outer race. The dynamic-static ferrofluid seal can be formed using the same permanent magnet and by forming the ferrofluid seal at each end of the annular single pole piece. In such an arrangement the nonmagnetic housing is partially removed, to permit the static seal end or surface of the pole piece to extend into a close, noncontacting relationship with the magnetically permeable, nonmoving or static; that is, internal, surface of the outer race, to form a small radial gap, with ferrofluid retained in the radial gap.

The invention will be described for the purpose of illustration only in connection with certain particular embodiments; however, it is recognized that various changes, additions, modifications and improvements may be made to the illustrated embodiments by those persons skilled in the art, but all falling within the spirit and scope of the invention.

DESCRIPTION OF THE EMBODIMENTS

Figure 1:
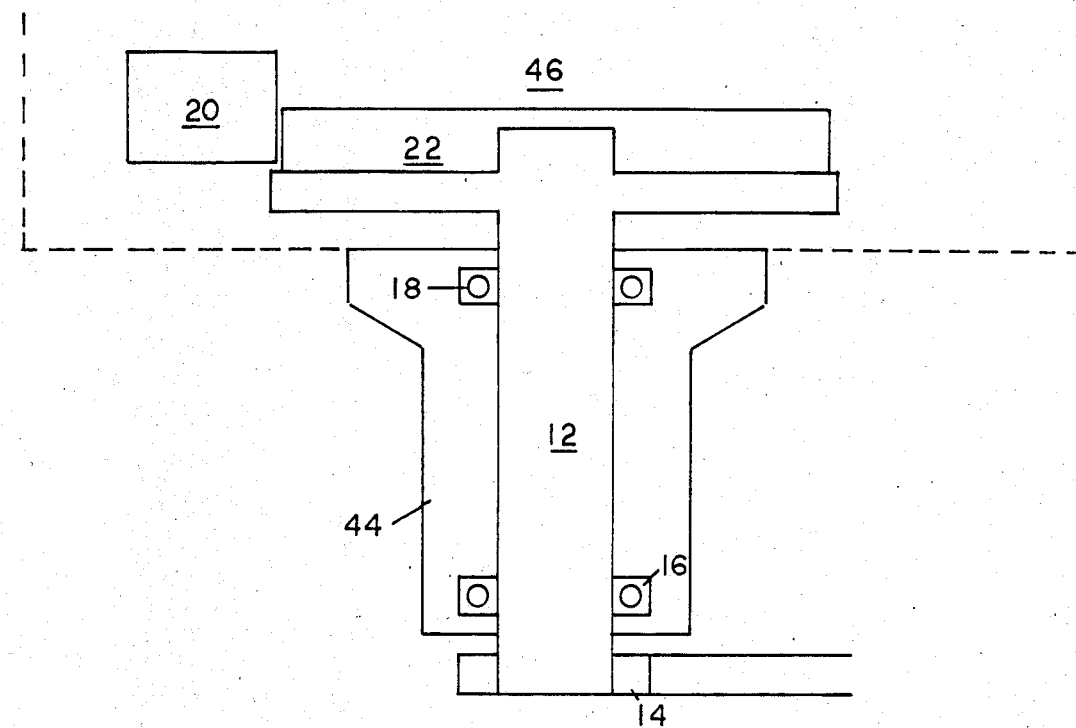
FIG. 1 is a schematic, perspective view of a computer-disc-drive system incorporating the bearing assembly with an integrated, single-stage ferrofluid seal of the invention.

FIG. 1 shows a computer-disc-drive-spindle system 10, but which includes the bearing assembly with the integrated ferrofluid seal of the invention. The system 10 includes a computer-disc-drive-spindle shaft 12 driven at high speed; for example, 2400 to 6000 rpms, by a motor (not shown), usually by a belt and pulley 14. An air-bearing memory-disc pack or reading head 20, which rides on an air fil, is positioned adjacent the top of the spindle shaft 12 by the disc 22 in a clean magnetic-disc area or chamber 46 maintained in a clean environment by filtered air or the use of an inert gas, such as helium. The spindle 12 is within a housing 44 and is supported by upper and lower bearing assemblies 16 and 18. Bearing assembly 16 may comprise a prior-art bearing, while bearing assembly 18 includes a ferroflud exclusion seal, and which bearing is described in more detail in FIG. 2.

Figures 2, 3:
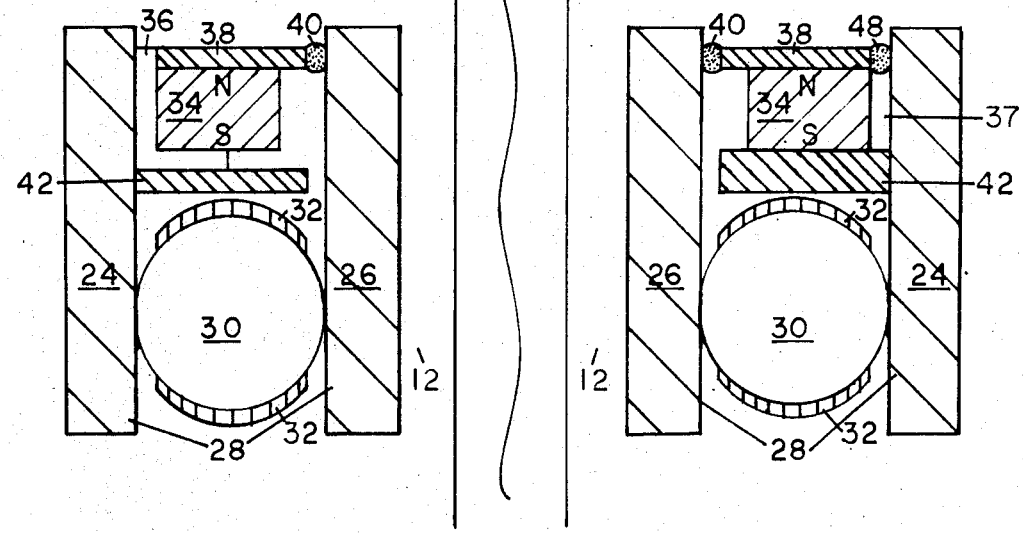
FIG. 2 is an enlarged, fragmentary, sectional view of one side of the bearing assembly of FIG. 1 with the integrated, single-pole-piece ferrofluid seal appratus.
FIG. 3 is an enlarged, fragmentary, sectional view of a dynamic-static ferrofluid seal in the bearing assembly of FIG. 1.

FIG. 2 illustrates the left-hand section of the upper bearing assembly 18, which shows a magnetically permeable inner race 26 and an outer race 24 which define therebetween an annular raceway 28, which raceway contains a plurality of uniformly spaced, magnetically permeable ball bearings 30 within a ball-bearing cage or keeper 32 on either side. A single-stage, single-pole-piece ferrofluid seal is disposed and positioned adjacent the raceway and directly downstream and toward the magnetic disc area 46 to be protected. The bearing assembly 18 optionally contains a magnetically permeable splash guard or shield 42 which generally extends across the raceway 28 toward the inner race 26, to form a small radial air gap. The guard 42 prevents contamination of the ferrofluid by the grease employed in the ball bearings and raceway, and aids in completion of the magnetic flux circuit with the outer surface of the inner race 26. The single-stage seal shown comprises an annular permanent magnet 34 composed of a low-flux magnet, such as a ceramic permanent magnet or a Plastiform (trademark) permanent magnet 34, with the magnet surrounded at the one end, on one side of the magnet and on one end of the pole piece 38 with a nonmagnetic, sectional, L-shaped housing 36 composed of aluminum or plastic. The pole piece 38 comprises a magnetically permeable material, such as steel, and is a single pole piece which extends at one end into a close, noncontacting relationship with the surface of the inner race 26 secured to spindle shaft 12, to form a radial gap therebetween, in which radial gap the magnetic flux is concentrated, and which contains a sealing amount of a hydrocarbon-based ferrofluid 40 which is compatible with the grease employed in the raceway 28. As described, the ferrofluid exclusion seal is placed only on the memory-disc area 46 side, although it is recognized that the seal, if desired in certain applications, where hostile environments are on both sides, may be placed on both sides, or a pressure-type seal may be employed on one or both sides if required. Also, the air gap between the end of the L-shaped housing 36 and the surface of the inner race 26 may be eliminated, and the splash guard 42 may extend along or adjacent the surface of the magnet 34.

FIG. 3 shows the bearing assembly of FIG. 1 which includes a static ferrofluid seal, by removing a portion of the nonmagnetic housing 36 to form a nonmagnetic housing 37 and extending the other end of the single pole piece 38 into a close relationship with the inner surface of the outer race 24, to form a small radial gap therewith, which retains a sealing amount of ferrofluid 48 in the radial gap, to form a static ferrofluid exclusion seal. As also illustrated in this embodiment, the one side of the housing 36 has been removed to form housing 37 and replaced with the splash guard 42.

The ball-bearing assembly described, with the integrated, uniquely designed, single-stage ferrofluid seal, is of a very compact, small-length deisng. The integration of the ferrofluid seal into the ball-bearing assembly permits significant reduction in overall length over the employment of separate components. The splash guard or magnetic spacer 42 is above the cage 32 defined by the ball bearing 30, to aid in completing the magnetic flux circuit, and to allow higher pressure capacities in the single-stage ferrofluid seal design. As described, low-energy magnets are employed for the seal, to minimize the effect of a strong magnetic flux ont he closely adjacent ball bearings. The radial gap is quite small, typically 2 to 6 mils, and generally is smaller than the air gap which exists between the end of the magnet and the inner surface of the inner race.

What is claimed is:

1. A bearing assembly with an integrated ferrofluid seal, which assembly comprises:
    (a) a magnetically permeable bearing assembly adapted to surround a rotatable shaft and having an inner race and a spaced-apart outer race to define a raceway therebetween, and roller elements retained in the raceway to provide for rotating of the inner and outer races relative to one another; and
    (b) a ferrofluid seal appratus in the raceway and generally closely adjacent the roller elements of the bearing assembly, which ferrofluid seal apparatus comprises:
        (i) a single magnetic pole piece having a one and other end, the one end radially extending into a close, noncontacting relationship with a surface of the inner or outer race, to define a small radial gap,
        (ii) an annular, axially-polarized permanent magnet having a radially disposed one periphery and another periphery relative to the axis of the shaft, the one periphery of the permanent magnet extending toward said radial gap to form an air gap with said race surface,
        (iii) ferrofluid retained in the radial gap by magnetic flux of the permanent magnet, to provide a ferrofluid exclusion seal with the said surface,
        (iv) a nonmagnetic housing positioned about the other periphery of the permanent magnet to divert the magnetic flux of the permanent magnet toward the said magnetically permeable race surface which forms the said radial and air gap, and
        (v) the magnetic flux circuit passing through the pole piece, the permanent magnet, the ferrofluid in the radial gap, said surface and the air gap.

2. The bearing assembly of claim 1 wherein the permanent magnet comprise a low-magnetic-energy, ceramic or polymeric permanent magnet.

3. The bearing assembly of claim 1 wherein the permanent magnet has a magnetic energy of about 1.1 to 1.5 million gauss-oersteds.

4. The bearing assembly of claim 1 wherein the magnetic flux density across the air gap ranges from about 2000 to 5000 gauss.

5. The bearing assembly of claim 1 wherein the ferrofluid comprises a hydrocarbon-based carrier liquid compatible with a lubricant employed with the roller elements.

6. The bearing assemlby of claim 1 which includes a magnetically-permeable splash guard having a one end and other end and extending generally perpendicularly from the inner or outer race between the ferrofluid seal and the roller elements and one end of the splash guard extending toward said surface of said raceway which forms the radial and air gap to form a small radial air gap with said raceway surface.

7. The bearing assembly of claim 1 wherein the roller elements comprise ball bearings.

8. The bearing assembly of claim 1 wherein the ferrofluid seal is positioned adjacent the roller elements on the side where the environment is to be protected by the ferrofluid seal.

9. The bearing assembly of claim 1 which includes a rotatable shaft element extending through the inner race and secured thereto.

10. The bearing assembly of claim 1 wherein the nonmagnetic housing has an L-shaped cross sectional configuration and extends in contact about the other periphery and along a substantial portion of the side of the permanent magnet toward the bearing roller elements.

11. The bearing assembly of claim 10 which includes a magnetically permeable splash guard having a one end and other end and extending adjacent on side of the permanent magnet oppsoite the pole piece, with one end of said splash guard extending into a close, noncontacting relationship with the said raceway surface whichforms the radial gap to provide a radial air gap with said raceway surface to aid in completion of the magnetic flux circuit and prevent contamination of the ferrofluid by the splashing of bearing lubricant.

12. The bearing assembly of claim 1 which includes a dynamic ferrofluid seal and a static ferrofluid seal, the annular pole piece forming at the one end a dynamic ferrofluid seal with one moving said raceway surface and the other end of the pole piece extending into a close, noncontacting relationship with the other nonmoving said raceway surface to form a radial gap therewith, and ferrofluid retained in the radial gap to form a static ferrofluid seal with the nonmoving raceway surface.

13. The bearing assembly of claim 12 which includes a magnetically permeable splash guard having a one end and other end and extending it contact with the said side of the housing and extending at the one end into a close, noncontacting relationship with said raceway surface to provide a radial air gap, the magnetic splash guard to aid in the completion of the magnetic flux circuit.

14. The bearing assembly of claim 1 wherein the housing is a nonmagnetic aluminum or plastic housing.

15. A computer-disc-drive system which comprises in combination:
 (a) a bearing assembly of claim 1;
 (b) a rotatable disc-drive-spindle shaft extending through the bearing assembly and secured to the inner race;
 (c) a memory-reading head in a protected environment;
 (d) a computer disc on the shaft and read by the reading head in the environment;
 (e) a means to rotate the shaft; and
 (f) the ferofluid seal having the radial gap formed with the inner surface of the inner race and positioned on the side of the roller elements toward the memory-reading head.

* * * * *